Nov. 30, 1948.   H. T. FAUS   2,454,966
HEATED STYLUS INKLESS RECORDER
Filed Feb. 14, 1947
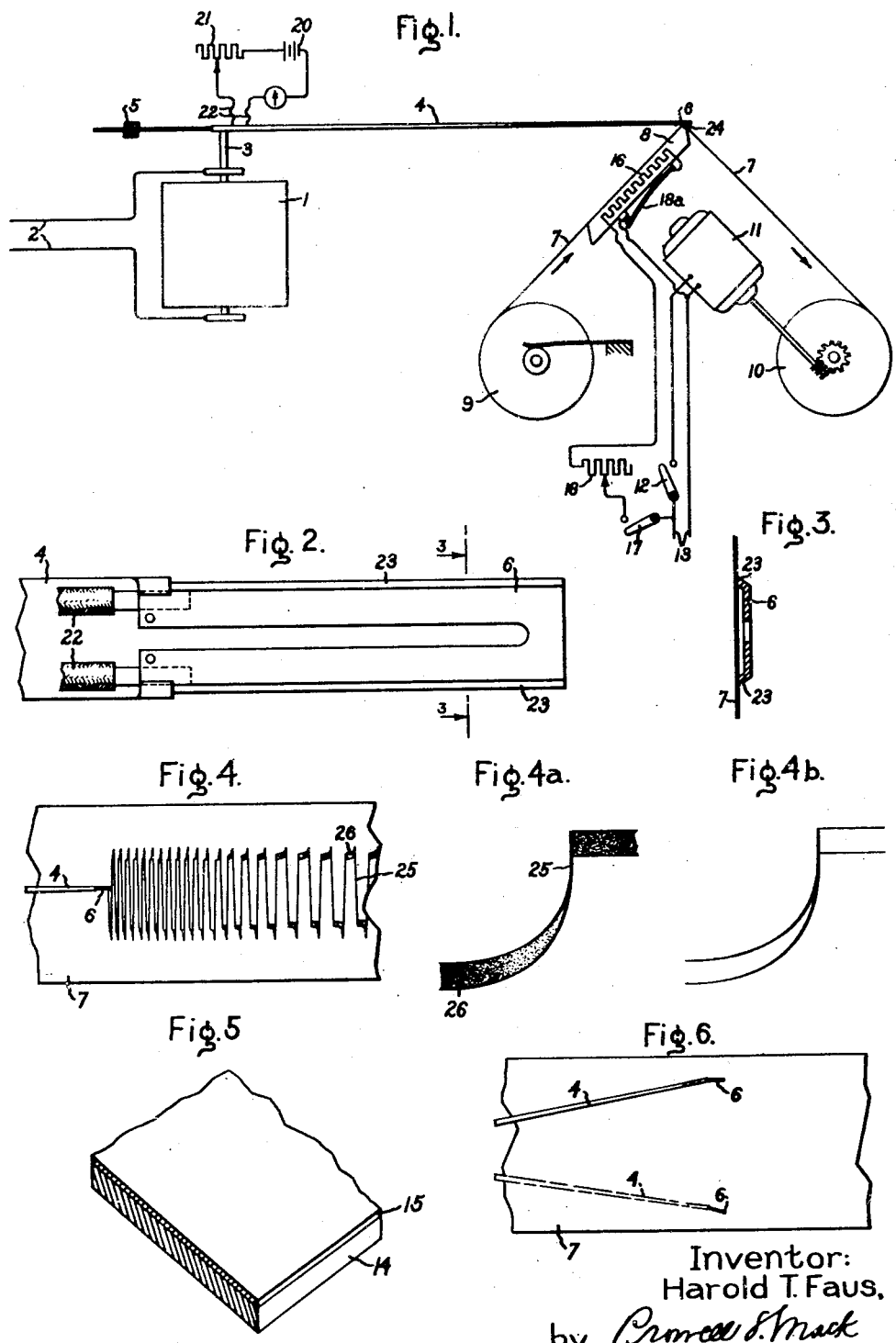
Inventor:
Harold T. Faus,
by Browell S. Mack
His Attorney.

Patented Nov. 30, 1948

2,454,966

UNITED STATES PATENT OFFICE 2,454,966

HEATED STYLUS INKLESS RECORDER

Harold T. Faus, Lynn, Mass., assignor to General Electric Company, a corporation of New York Application February 14, 1947, Serial No. 728,554

6 Claims. (Cl. 346—112)

My invention relates to the art of recording and, in particular, to a recorder stylus and its method of recording on suitable recorder chart material adapted for use therewith. Important objects of my invention are to produce clear, permanent records without ink, with a rapidly moving stylus and with a low order of drag between the stylus and recorder chart.

Another object is to provide an improved recorder for electrocardiographs by means of which electrocardiograph records having the characteristics insisted upon by physicians are obtained.

In carrying my invention into effect, I employ a chart having a coating which may be easily removed by a scraping action and which may be rendered transparent by heating, together with a recording stylus which when moved rapidly transversely of the chart primarily records by scraping off the chart coating, and which when moved more slowly relative to the chart, particularly in the direction of chart movement, primarily records by rendering the coating transparent by heating. Preferably, the recording platen over which the chart rests or travels has a relatively sharp ridge at the recording position, and the stylus is shaped and dimensioned so that the portion of a record made transversely of the chart primarily by scraping is a fine, thin line, while the portion caused primarily by movement of the chart relative to the stylus by heating is a broad, heavy line. Thus, electrocardiograph records produced in accordance with my invention have the characteristics demanded by physicians.

The features of my invention which are believed to be novel and patentable will be pointed out in the claims appended hereto. For a better understanding of my invention, reference is made in the following description to the accompanying drawings in which Fig. 1 is a side view of recorder apparatus embodying my invention; Figs. 2 and 3 are enlarged bottom and cross-sectional views of a stylus embodying my invention; Fig. 4 is a typical record made with the recording apparatus of my invention; Figs. 4a and 4b represent enlarged record portions; Fig. 5 is an enlarged cross section perspective of recorder chart material suitable for use with my invention; and Fig. 6 shows the stylus set at a slight angle to the recording arm.

Referring now to Fig. 1, I have here represented a side view of a recording instrument comprising an electric measuring instrument 1 adapted to have its moving coil energized from a source of current or voltage to be recorded over leads 2. On its shaft 3 is a recording arm 4 with counterweight 5 and stylus 6. The stylus rests very lightly on a recording chart 7 which is preferably drawn over a recording platen 8 from a supply spool 9 to a reroll spool 10 by a suitable timer motor 11, represented as of the electrical type adapted to be energized through a switch 12 from a source 13.

A recorder chart suitable for my purposes is described in United States Letters Patent No. 2,299,991 to Kallock, October 27, 1942. A sectioned portion of chart material is represented in Fig. 5 and may consist of a dark colored foundation or backing paper 14 covered by a recording surface layer 15 of light colored lacquer. The surface layer 15 as described in the patent is normally opaque but is rendered transparent by pressure and is said to be pressure sensitive. If suitable pressure is applied thereto by a stylus drawn over the chart on the recording surface 15, the lacquer is rendered transparent so as to reveal a line of the dark colored base paper 14 where the stylus pressure was applied.

I have found that the lacquer coating 7 is also rendered transparent by heating and when warm is relatively soft and may be scraped off. Hence, such paper can be used for recording purposes by three methods, namely, by pressure and heat, to render the coating transparent, and scraping off or removing the surface coating. Any one of these three methods or a combination of them will make visible the darker base paper where the method in question is applied and thus produce a record.

In experimenting with this type of recorder paper, it has been found that the pressure which it is necessary to apply for some high speed sensitive measuring instruments in order to obtain a good record is higher than is desirable because the necessary stylus pressure produces a friction drag on the recorder arm that interferes with the measurement accuracy. Using more softening material in the lacquer coating will reduce the pressure and friction requirements but this renders the coating too soft for handling and storage purposes. According to my method of recording, the pressure sensitive characteristics of the chart material are not much used or at least not used to the extent contemplated in the above-mentioned patent. According to my invention, the record is produced primarily by scraping off the surface coating 7 to reveal the darker base paper, and also by heating the coating to render it transparent. I may therefore use other types of recording paper such, for example, as a dark base paper covered by a coating of normally opaque wax which is rendered transparent by heating and may be readily removed by a suitable stylus. However, the chart material made just as described in the above-mentioned patent is satisfactory for my purposes.

It is to be noted that the recording platen 8, Fig. 1, is provided with an electric heater represented at 16, so that the paper is warmed up as it approaches recording position under the stylus. This preliminary warming up of the paper is not sufficient to make the recording surface transparent, nor is it harmful with respect to subsequent handling and storage, because the paper cools again as it passes beyond recording position and before it reaches the reroll spool 10. It does, however, temporarily render the lacquer coating appreciably softer at the point where its upper surface is contacted only by the recording stylus and, therefore, reduces the heating, scraping, or pressure to be applied by the stylus in order to produce a good record and is a useful expedient for any one of the methods of recording mentioned or a combination of such methods. The heater 16 is supplied from the source 13 through a switch 17 and a variable resistance 18 by means of which the desired magnitude of heating may be controlled and, preferably, also through an automatic bimetal type thermostat 18a thermally associated with platen 8 adjusted to maintain the temperature of the platen within close temperature limits. I have found that the platen 8 may be heated to advantage to a temperature of from 90 to 150 degrees centigrade, the preferred temperature depending on several factors, such as the age and amount of softening material used in lacquer covered paper, the weight of the paper used, its rate of travel, and the temperature and speed of travel of the stylus 6.

An enlarged bottom view of a preferred form of stylus 6 to be used is shown in Fig. 2, and a cross-sectional view of the stylus and its manner of contact with the recording chart 7 is shown in Fig. 3. The stylus is rigidly fixed to but insulated from the recording arm 4 and consists of a flat loop of resistance conducting material such, for example, as nichrome. The stylus is connected in the circuit of a source of supply such as represented at 20 through an adjustable resistance 21 and insulated wires 22 extending along the recording arm from its axis of rotation to the stylus. For electrocardiograph work the stylus may be made of thin, flat 0.006-inch stock with its side edges 23 turned down to contact the recording chart. The total width of the stylus may be $\frac{1}{16}$ inch and its length about ¼ inch; it may have a resistance of about 0.12 ohm. Satisfactory results are obtained by applying about ½ volt across the stylus and operating it at a temperature of between 450 and 550 degrees C. The heating energy used is less than 12 watts. This stylus rests very lightly against the record sheet at the ridge at 24 formed by the upper sharply rounded end of the platen 8 where the chart forms a sharp bend over the nose of the platen. The longitudinal axis of the stylus extends generally in the direction of travel of the chart, so that essentially a two-point contact is made between the stylus 6 and the chart 7 at the two outer turned down edges 23 of the stylus.

When the stylus is deflected across the chart by a measurement change, the forward edge 23 presents a cutting edge to the softened lacquer coating along the ridge of the platen and removes the coating in a thin traverse line, revealing the dark under paper as a permanent record. The sidewise force necessary to produce such a record is materially less than the force necessary to produce a similar record by rendering the coating transparent by stylus pressure, particularly where the coating has not been temporarily softened by heating. The trailing edge of the stylus following essentially in the same path as the leading edge improves the record. Whatever little downward pressure may exist aided by the heat of the trailing edge of the stylus will also improve the record by increasing the transparency of any lacquer coating that may remain in the contact path thereof. As a result, a fine, thin, clearly legible line record is produced transversely of the chart as represented at point 25, Figs. 4 and 4a, for rapid deflections.

Another advantage of this recorder is that using a straight nose 24 or ridge on the platen 8, and assuming a stationary record sheet, the transverse records are straight instead of being curved, and hence, can be correctly coordinated with straight-line time graduations transversely of the chart where the chart is advanced at a uniform rate. This feature would be present using a stylus with only a single cutting runner 23 and this is included in my invention. The length of the stylus should be sufficient to bear against the chart over the recording ridge 24 at the center and extremities of its swing. Thus, for short recording arms and wide charts with a correspondingly large angle of swing, a longer stylus would be needed than when a long recording arm and relatively narrow chart and small angle of swing are used. While wear of the stylus does not appear to be troublesome, it is to be noted that the points of contact of the stylus changes as the recorder arm swings, and hence, wear is distributed over a large portion of the contact area.

When the stylus is not deflecting and the record sheet moves, a different type of record is produced as represented at 26 in Figs. 4 and 4a. At such times the relative movement of the stylus and record sheet resembles that of a sled running substantially straight over a round, snow-covered stick, with the edges 23 of the stylus corresponding to the runners of the sled and the ridge 24 corresponding to the stick, and the chart 7 as snow. The edges 23 of the stylus now approach the chart surface at a wedging angle instead of a cutting angle, and the surface coating of the chart is not removed but is slightly compressed and is heated at the points of contact and becomes transparent. Also, because the chart now moves quite slowly beneath the stylus, the chart area beneath the stylus and between the contacting edges 23 where the chart comes closest to the stylus has time to be appreciably heated by the hot stylus and as a result this chart area is also rendered transparent. The cover shape and action of the stylus confines the heating to the chart area directly beneath it to good advantage. Hence, the record produced when the stylus is stationary and the chart moves is a heavy black line corresponding to the width of the stylus, and is produced primarily by heating causing the white lacquer or wax coating to become transparent and rendering visible the black under paper. This record is permanent, since the coating does not again become opaque after cooling. This type of record at 26 has its edge extremities produced by the edges 23 very clearly and sharply defined, due to the direct contact of the hot stylus at these points.

The record shown in Fig. 4 is a reproduction of an actual record taken with my recorder under the following circumstances: The chart was 2⅜ inches wide and advanced at the rate of one inch per second. The record is that of a square wave generator, the frequency of which was varied. The maximum transverse deflection of the stylus was at the rate of about 10 feet per second. The damping of the measuring instrument was made such as to provide some overshoot of the stylus at the ends of transverse swings as indicated by the record. The platen was maintained at about 100 degrees C. and the stylus between 400 and 500 degrees C. A stylus pressure of the order of 10 grams was used. It would be necessary to maintain a stylus pressure using a single point stylus of about 50 grams to produce equally clear records by pressure alone if the stylus and chart were at normal room temperature, and the broad type of record as at 26 would not be produced. Using the ordinary single point stylus, a flat platen surface would be necessary and the transverse lines would be curved instead of straight.

When the stylus is deflated very slowly and the chart is moving, there is a combination of both types of recording described above. That is, there are both a sidewise scraping-off action of the surface coating 7 and sufficient heating of the adjacent surface to render it more or less transparent. The sidewise scraping-off action is facilitated by the additional softening of the coating incident to additional heating due to the slower motion between stylus and chart as compared to rapid deflation movements. On the other hand, the transparency of that area of the chart rendered transparent by heating may not be quite so clear. Hence, there is a compromise shading effect both as regards the width of the record and its intensity, such as is represented in an enlarged fragmentary view of such a record in Fig. 4a between the points 25 and 26.

If the record of Fig. 4a were produced with the heating of the stylus cut off, it would appear as in Fig. 4b, with that portion of the record produced primarily by pressure very faint and hardly discernible.

From the explanation given, it will be evident that the character of the record produced may be varied considerably or will be varied by such factors as rate of deflation of the stylus, rate of travel of the record sheet width, pressure and heating of the stylus, nature and temperature of the recording chart, room temperature and sharpness of the recording platen ridge at 24. The factor data which have been particularly mentioned herein have been found suitable for electrocardiographs where the specified type of chart advance is at the rate of 1 inch per second, and the maximum rate of deflation of the stylus is of the order of 120 inches per second.

A very sensitive and accurate electrical measuring instrument may be used because the friction drag of the recording stylus has been reduced to about 1/10 heretofore found necessary, permitting a corresponding increase in instrument sensitivity and accuracy in recording. The records produced for electrocardiograph work have the characteristic with which physicians are familiar and which they insist upon. Thus, the records produced are characterized by the heaviness of the record line at the high and low extremities when there is little movement of the stylus and the lightness of the line between these points when the stylus is deflated rapidly. If desired, the width of the record at one extremity of the recorder arm swing may be wider than at the other extremity by securing the stylus 6 to the recording arm 4 at a slight angle as represented in Fig. 6. Here the longitudinal axis of the stylus is parallel to the direction of travel of the record sheet when the arm 4 is swung to the upper position, and at an angle thereto when arm 4 is swung to the lower position. The heating records produced in the last mentioned position will be wider than those produced in the first mentioned position of the stylus.

Heretofore electrocardiograph records have usually been produced photographically, and this accounts for the character of record with which physicians have become familiar. Such recorders used a much heavier, more costly and larger photographic recording instrument with its light-tight photographic recording facilities. While good records were produced, it was necessary first to take the records to a dark room for development before they could be studied. With my recorder it is possible to observe the heart action record of a patient at the same time it is produced, and for a physician or surgeon to be guided thereby immediately as, for example, during an operation.

The extent to which the record sheet coating is heated by the stylus or the platen or both will depend in a large measure on the character of the record sheet coating and while one suitable chart material has been specified, it is expected that others may be used which will require various degrees of heating or pressure or both to produce satisfactory records in accordance with my invention, and embodiments are contemplated where a lesser degree of heating is required and where the heating of either the stylus or platen may be dispensed with.

What I claim as new and desire to secure by Letters Patent of the United States is:

1. Recording apparatus comprising a recording platen having a relatively sharply rounded straight edge, means for supporting a recording sheet over such edge such that the record sheet is bent thereover, a recording arm having a stylus resting lightly on the record sheet only at such bent portion, said stylus being heated and having a straight edge record sheet contacting surface at approximately right angles to the first-mentioned straight edge and a recording motion generally transversely of the record sheet opposite the straight edge of said platen, the record sheet having a paper backing of one color and a recording surface of a contrasting color, such surface being of such character as to be softened by heating, and means in addition to the stylus for heating such recording surface which is in contact with the recording stylus sufficiently to soften such surface to permit its removal by the transverse recording motion of the stylus at the point of contact sufficiently to render visible the paper backing as a record.

2. Recording apparatus comprising a recording platen having a record sheet heating surface area and a relatively sharply rounded straight edge adjacent the heating area, means for passing a record sheet over the heating surface of said platen in the direction of the straight edge and around the straight edge, a recording arm having a stylus resting lightly against the record sheet only where it is bent around the straight edge, said stylus having a recording motion generally transversely of the record sheet opposite such straight edge, the record sheet used having a paper backing of one color and a recording surface of a contrasting color, said recording surface being of such character as to be softened by heating, means for heating said platen and means for heating said stylus to a higher temperature than the platen such that the recording surface of the record sheet at the point of contact with the stylus is softened sufficiently as to be removed sufficiently by the transverse recording motion of the stylus as to render visible the paper backing as a record.

3. Recording apparatus comprising a recording platen having a relatively sharply rounded straight edge nose, means for passing a recording sheet over said nose so as to be bent thereat to present a straight line recording area, a recording instrument including a stylus adapted to rest lightly against such recording sheet only where it passes over the nose and having a recording motion generally transversely of the record sheet opposite the straight edge nose of the platen, said stylus being of thin sheet metal in the form of a flat U with the outer edges of the legs of the U bent down to form straight parallel runners which rest on the record sheet at two points slightly spaced apart transversely of the record sheet and which form scraping edges with respect to the recording surface of the record sheet during transverse recording movement of the stylus, the record sheet used having a paper backing of one color and a recording surface of a contrasting color and of a character to be softened by heating, and means for heating such recording surface at the points of contact with the stylus including means for passing an electric current through said stylus to the extent necessary to permit such surface to be removable sufficiently by the transverse scraping recording movement of the stylus to render the backing paper visible therethrough as a record.

4. Recording apparatus employing a record sheet having a backing of one color and a recording surface of a contrasting color, said coating being of a character to be rendered transparent and to be softened by heating, a recording platen having a relatively sharply rounded straight edge, means for passing the recording chart thereover so as to bend the same over and around the rounded straight edge with the recording surface exposed, a recording arm having a stylus resting lightly on such exposed recording surface only at such bend, said stylus having a recording motion generally transverse to the record sheet opposite said straight edge, said stylus being of sheet conductor material cut in the form of a U and with the outer edges of the limbs of the U bent toward the recording surface to contact therewith at two closely adjacent points transversely of the record sheet, said edges forming scrapers for the purpose of removing the surface coating of the record sheet and producing a record when the stylus is moved transversely of such record sheet, and means for passing an electric current through said stylus for heating the same, said chart being heated sufficiently at the point of contact with the stylus to render the coating sufficiently transparent to produce a permanent record when the stylus is stationary and the record sheet is moved slowly therepast.

5. Recording apparatus for producing electrocardiograph records comprising an electrical measuring instrument responsive to the current to be measured, said instrument having a recording arm adapted to swing in an arc and having a metallic recording stylus on the outer end, a recording platen having a relatively sharply rounded straight line nose extending at right angles to the recording arm when the latter is at a midrange position and closely adjacent the stylus, means for passing a record sheet over and around said straight edge nose between it and the stylus such that the stylus rests lightly only on the exposed bent surface of the record sheet where it is drawn over such nose, said stylus being of sufficient length in the direction of the recording arm to contact the straight edge bend formed in the record sheet by the nose for all recording positions, the recording sheet used having a backing of one color and recording surface of a contrasting color, said surface being of a character such as to be rendered transparent and to be softened by heating, said stylus having a straight line scraping edge contacting the recording sheet at the bend therein at an appreciable angle to the line of the platen nose and a portion spaced slightly from the recording sheet of an appreciable width transversely of the record sheet, and means for heating the record sheet coating where in contact with said stylus, including means for passing a heating current through said metallic stylus such that the chart coating is softened sufficiently to permit it to be scraped off to produce a thin line record when the stylus moves rapidly transversely of the record sheet and to render the coating transparent by heating to produce a thick line record comparable to the width of the stylus lengthwise of the record sheet when the stylus is stationary and the sheet moves slowly thereunder.

6. Recording apparatus comprising a platen having a relatively sharp rounded straight line edge, means for moving a record sheet over said platen at a relatively slow constant rate and around said edge such that a convex exposed bulge is produced in the record sheet at such edge, said platen having a heating surface over which the chart passes as it approaches such edge, means for heating such surface to approximately a predetermined temperature, an electrically heated stylus resting lightly on the record sheet only at the bulge therein and movable along said bulge in contact with the record sheet transversely of the record sheet in response to variations to be recorded, said stylus being heated to a higher approximate predetermined temperature than the platen heating surface, the record sheet used having a backing and recording surface layer of contrasting colors, and the recording surface being pressure sensitive and of a character to be rendered transparent by such combined heating at the recording line beneath the stylus only when the stylus is practically stationary, and of a character to be softened by such combined heating so as to be easily scraped off to reveal the backing layer as a record when the stylus is moved rapidly transversely of the moving record sheet, said surface when cool being sufficiently hard to prevent marking by reason of the stylus pressure used and to permit ordinary handling without marring.

HAROLD T. FAUS.

REFERENCES CITED

The following references are of record in the file of this patent:

UNITED STATES PATENTS

| Number | Name | Date |
| --- | --- | --- |
| 912,181 | Schattner | Feb. 9, 1909 |
| 1,765,988 | Mayer et al. | June 24, 1930 |
| 1,820,088 | Parker et al. | Aug. 25, 1931 |
| 1,901,921 | Means | Mar. 21, 1933 |

Certificate of Correction

Patent No. 2,454,966.  November 30, 1948.

HAROLD T. FAUS

It is hereby certified that errors appear in the printed specification of the above numbered patent requiring correction as follows:

Column 5, lines 23 and 73, for the word "deflated" read *deflected*; same column, lines 33, 49, and 58, for "deflation" read *deflection*;

and that the said Letters Patent should be read with these corrections therein that the same may conform to the record of the case in the Patent Office.

Signed and sealed this 7th day of June, A. D. 1949.

[SEAL]

THOMAS F. MURPHY,
*Assistant Commissioner of Patents.*